(12) United States Patent
Takami et al.

(10) Patent No.: US 8,603,675 B2
(45) Date of Patent: *Dec. 10, 2013

(54) NONAQUEOUS ELECTROLYTE BATTERY

(75) Inventors: Norio Takami, Yokohama (JP); Hiroki Inagaki, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/285,069

(22) Filed: Oct. 31, 2011

(65) Prior Publication Data

US 2012/0052399 A1    Mar. 1, 2012

Related U.S. Application Data

(63) Continuation of application No. 11/088,762, filed on Mar. 25, 2005, now Pat. No. 8,088,514.

(30) Foreign Application Priority Data

Mar. 31, 2004 (JP) .................................. 2004-103854
Mar. 4, 2005 (JP) .................................. 2005-059842

(51) Int. Cl.
  *H01M 4/13*  (2010.01)
  *H01M 4/58*  (2010.01)
  *H01M 8/14*  (2006.01)

(52) U.S. Cl.
  USPC ....................................... 429/218.1; 429/163

(58) Field of Classification Search
  None
  See application file for complete search history.

(56) References Cited

U.S. PATENT DOCUMENTS

| | | | | |
|---|---|---|---|---|
| 4,882,244 A | * | 11/1989 | Donahue et al. | 429/339 |
| 5,545,468 A | | 8/1996 | Koshiba et al. | |
| 5,882,818 A | * | 3/1999 | Fujimoto et al. | 429/332 |
| 6,063,142 A | * | 5/2000 | Kawakami et al. | 29/623.5 |
| 6,156,459 A | | 12/2000 | Negoro et al. | |
| 2002/0061443 A1 | * | 5/2002 | Nakanishi et al. | 429/223 |
| 2002/0172865 A1 | * | 11/2002 | Che et al. | 429/231.1 |

(Continued)

FOREIGN PATENT DOCUMENTS

| | | |
|---|---|---|
| CN | 1095191 A | 11/1994 |
| CN | 1110008 A | 10/1995 |

(Continued)

OTHER PUBLICATIONS

Ladislav Kavan, et al., "Li Insertion into $Li_4Ti_5O_{12}$(Spinel) Charge Capability vs. Particle Size in Thin-Film Electrodes", Journal of the Electrochemical Society, 150 (7), A1000-A1007, (2003).

(Continued)

*Primary Examiner* — Barbara Gilliam
*Assistant Examiner* — Stephan Essex
(74) *Attorney, Agent, or Firm* — Oblon, Spivak, McClelland, Maier & Neustadt, L.L.P.

(57) ABSTRACT

A nonaqueous electrolyte battery includes a positive electrode containing an active material, a negative electrode, and a nonaqueous electrolyte, the negative electrode including a current collector and a negative electrode active material supported by the current collector, the negative electrode active material having a Li insertion potential not lower than 0.2V (vs. $Li/Li^+$) and an average primary particle diameter not larger than 1 μm, and a specific surface area of the negative electrode, excluding a weight of the current collector, as determined by the BET method falls within a range of 3 to 50 $m^2/g$.

22 Claims, 1 Drawing Sheet

(56) References Cited

U.S. PATENT DOCUMENTS

| | | | |
|---|---|---|---|
| 2003/0064288 A1* | 4/2003 | Barker et al. | 429/231.1 |
| 2003/0157407 A1 | 8/2003 | Kosuzu et al. | |
| 2004/0048152 A1 | 3/2004 | Yata et al. | |
| 2004/0224229 A1 | 11/2004 | Mansuetto et al. | |
| 2004/0234866 A1 | 11/2004 | Yamaguchi et al. | |
| 2006/0166093 A1* | 7/2006 | Zaghib et al. | 429/217 |

FOREIGN PATENT DOCUMENTS

| | | |
|---|---|---|
| CN | 1236492 A | 11/1999 |
| JP | 11-7944 | 1/1999 |
| JP | 2001-143702 | 5/2001 |
| JP | 2002-42889 | 2/2002 |
| JP | 2003-505326 | 2/2003 |
| JP | 2003-514353 | 4/2003 |
| JP | 2004-527888 | 9/2004 |
| KR | 2002-0026245 | 4/2002 |
| KR | 2002-0026655 | 4/2002 |
| KR | 2002-0059703 | 7/2002 |
| KR | 10-2004-0007597 | 1/2004 |

OTHER PUBLICATIONS

Kiyoshi Nakahara et al., "Preparation of particulate Li4Ti5O12 having excellent characteristics as an electrode active material for power storage cells," Journal of Power Sources, vol. 114, pp. 131-136, Jan. 2003.

A.D. Robertson et al., "New inorganic spinel oxides for use as negative electrode materials in future lithium-ion batteries," Journal of Power Sources, vol. 81-82, pp. 352-357, Sep. 1999.

* cited by examiner

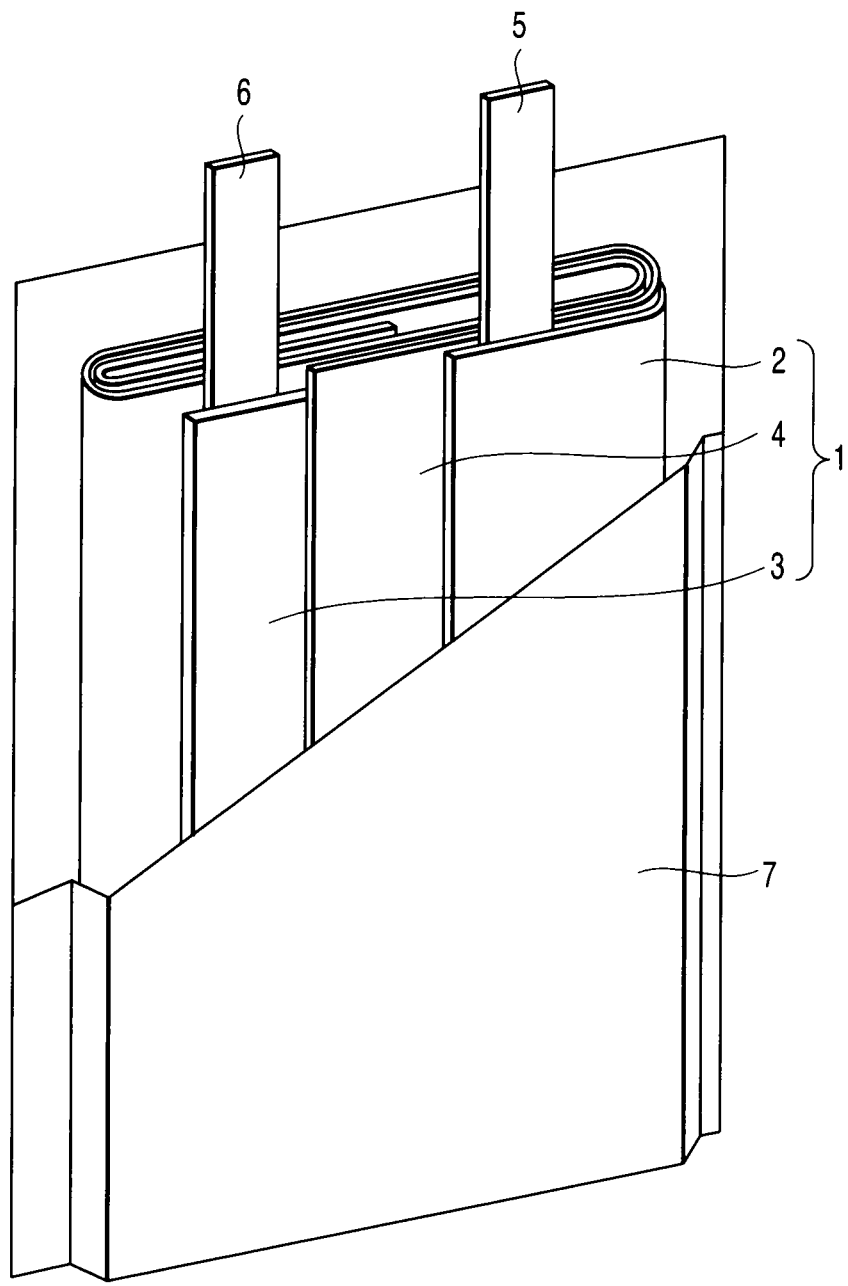

NONAQUEOUS ELECTROLYTE BATTERY

CROSS-REFERENCE TO RELATED APPLICATIONS

This application is a continuation of claims the benefit of priority under 35 U.S.C. §120 from U.S. Ser. No. 11/088,762 filed Mar. 25, 2005, and claims the benefit of priority under 35 U.S.C. §119 from Japanese Patent Application Nos. 2004-103854 filed Mar. 31, 2004 and No. 2005-059842 filed Mar. 4, 2005, the entire contents of each of which are incorporated herein by reference.

BACKGROUND OF THE INVENTION

1. Field of the Invention

The present invention relates to a nonaqueous electrolyte battery.

2. Description of the Related Art

A nonaqueous electrolyte battery in which lithium metal, a lithium alloy, a lithium compound or a carbonaceous material is used for forming the negative electrode is expected to provide a battery of a high energy density, and vigorous research is being conducted in an attempt to develop the particular nonaqueous electrolyte battery. A lithium ion battery comprising a positive electrode containing $LiCoO_2$ or $LiMn_2O_4$ as the active material and a negative electrode containing a carbonaceous material that intercalates-releases lithium has been widely put to the practical use. Also, use of a metal oxide or an alloy in place of the carbonaceous material in the negative electrode is being studied. Particularly, in the case of mounting the battery in a vehicle such as an automobile, the negative electrode is required to be formed of a material excellent in chemical and electrochemical stability, in mechanical strength and in corrosion resistance in view of cycle performance in a high-temperature environment and reliability of high rate discharging over a long time. On the other hand, a nonvolatile and incombustible electrolysis solution, which is being developed as the nonaqueous electrolyte in view of improvement in safety, has not yet been put to practical use because the high-rate characteristics and the long life performance are reduced.

Various studies are being made in an attempt to improve the negative electrode characteristics. For example, Japanese Patent Disclosure (Kokai) No. 2002-42889 teaches that a negative electrode prepared by allowing a specified metal or alloy to be supported by a current collector formed of aluminum or an aluminum alloy is used in a nonaqueous electrolyte secondary battery.

In the secondary battery of the type noted above, the current collector included in the negative electrode does not have a sufficiently high mechanical strength. Therefore, if the negative electrode is made thinner to increase the density of the negative electrode, it is possible for the battery to be markedly restricted in battery capacity, the high-rate performance, cycle life and reliability. Also, if the particle diameter of the active material of the negative electrode is increased in place of decreasing the thickness of the negative electrode, the interface resistance of the negative electrode is increased so as to make it more difficult to bring about a high performance.

On the other hand, Japanese Patent Disclosure No. 2001-143702 teaches that secondary particles having an average particle diameter of 5 to 100 μm, which are formed by the agglomeration of primary particles of a lithium titanate compound represented by $Li_aTi_{3-a}O_4$ (0<a<3), the primary particles noted above having an average primary particle diameter smaller than 1 μm, are used as the active material of the negative electrode. It is taught in this connection that the agglomeration of the secondary particles is suppressed, and that the yield of manufacture of the negative electrode for a large battery having a large area can be increased.

The battery disclosed in Japanese Patent Disclosure No. 2001-143702 referred to above certainly makes it possible to suppress the agglomeration of the secondary particles. However, since the primary particles are agglomerated, the irregularity on the surface of the negative electrode becomes rough, thereby decreasing the surface area of the negative electrode. In addition, the battery in this prior art is defective in that the affinity of the negative electrode with the nonaqueous electrolyte is lowered so as to shorten the charge-discharge cycle life of the battery.

BRIEF SUMMARY OF THE INVENTION

An object of the present invention is to provide a nonaqueous electrolyte battery excellent in both the high-rate characteristics and the charge-discharge cycle characteristics.

According to a first aspect of the present invention, there is provided a nonaqueous electrolyte battery comprising a positive electrode containing an active material, a negative electrode, and a nonaqueous electrolyte, wherein:

the negative electrode includes a current collector and a negative electrode active material supported by the current collector; and the negative electrode active material has a Li insertion potential not lower than 0.2V (vs. Li/Li$^+$) and an average primary particle diameter not larger than 1 μm, and a specific surface area of the negative electrode, excluding a weight of the current collector, as determined by the BET method falls within a range of 3 to 50 m$^2$/g.

According to a second aspect of the present invention, there is provided a nonaqueous electrolyte battery comprising a positive electrode containing an active material, a negative electrode, and a nonaqueous electrolyte; wherein:

the negative electrode includes a current collector and a negative electrode layer supported by the current collector, and the negative electrode layer containing a negative electrode active material; and the negative electrode active material has a Li insertion potential not lower than 0.2V (vs. Li/Li$^+$) and an average primary particle diameter not larger than 1 μm, and a specific surface area of the negative electrode layer as determined by the BET method falls within a range of 3 to 50 m$^2$/g.

Further, according to a third aspect of the present invention, there is provided a nonaqueous electrolyte battery, comprising a positive electrode containing an active material, a negative electrode, and a nonaqueous electrolyte; wherein:

the negative electrode includes a current collector and a negative electrode layer supported by the current collector, and the negative electrode layer containing a negative electrode active material that includes a lithium titanium oxide and/or a titanium-containing composite oxide; and the negative electrode active material has an average primary particle diameter not larger than 1 μm, and a specific surface area of the negative electrode layer as determined by the BET method falls within a range of 3 to 50 m$^2$/g.

BRIEF DESCRIPTION OF THE SEVERAL VIEWS OF THE DRAWING

The single FIGURE is an oblique view, partly broken away, showing a thin nonaqueous electrolyte secondary battery according to one embodiment of the nonaqueous electrolyte battery of the present invention.

DETAILED DESCRIPTION OF THE INVENTION

In order to achieve the object described above, the negative electrode included in the nonaqueous electrolyte battery contains a negative electrode active material exhibiting a Li insertion potential not lower than 0.2V (vs. Li/Li$^+$), i.e., capable of lithium insertion at a potential nobler by least 0.2V than the Li electrode potential. The negative electrode active material contains primary particles having an average primary particle diameter not larger than 1 μm. The agglomeration of the primary particles is suppressed so as to permit the primary particles to be distributed uniformly within the negative electrode. As a result, a fine irregularity is formed on the surface of the negative electrode and, thus, the specific surface area of the negative electrode as determined by the BET method utilizing the $N_2$ adsorption is increased to fall within a range of 3 to 50 m$^2$/g. The negative electrode of the particular construction permits improving the affinity with the nonaqueous electrolyte so as to lower the electrode interface resistance and, thus, to improve the high-rate characteristics and the charge-discharge cycle characteristics of the nonaqueous electrolyte battery.

In the negative electrode described above, the surface area is increased by the uniform dispersion of the fine particles and, thus, the negative electrode is free from an increase in the porosity or a decrease of the electrode density as in the case where the surface area is increased by a perforating treatment. It follows that the surface area of the negative electrode can be increased while maintaining an appropriate porosity of the negative electrode so as to make it possible to realize a negative electrode having a large surface area and a high density.

Further, the operating voltage of the battery can be increased by using a lithium titanium oxide and/or a titanium-containing composite oxide as the active material of the negative electrode and by using a Spinel-type lithium-manganese-nickel composite oxide as the active material of the positive electrode. Alternatively, it is possible to realize a nonaqueous electrolyte battery excellent in the thermal stability by using a lithium-phosphorus oxide of an olivine structure such as Li$_x$FePO$_4$, Li$_x$Fe$_{1-y}$Mn$_y$PO$_4$, Li$_x$VPO$_4$F or Li$_x$CoPO$_4$ as the active material of the positive electrode. Incidentally, it is desirable for x in the chemical formulas given above to meet the condition of 0<x<1.

The negative electrode, the positive electrode and the nonaqueous electrolyte included in the nonaqueous electrolyte battery will now be described in detail.

1) Negative Electrode:

The negative electrode includes a negative electrode current collector and a negative electrode layer supported on one surface or both surfaces of the current collector. The negative electrode layer contains an active material, a conductive agent and a binder.

The lithium insertion potential of the negative electrode active material is defined to be at least 0.2V (vs. Li/Li$^+$) as described above. Where an active material such as a carbonaceous material or the lithium metal, which permits the lithium insertion at a baser potential than 0.2V (vs. Li/Li$^+$), is used, the reduction and decomposition of the nonaqueous electrolyte are promoted if the specific surface area of the negative electrode is increased to 3 to 50 m$^2$/g. As a result, the overall battery characteristics including the high-rate characteristics and the charge-discharge cycle characteristics are lowered. It is desirable for the lithium insertion potential to be 0.4V (vs. Li/Li$^+$) or nobler. Also, it is desirable for the upper limit of the lithium insertion potential to be 3V (vs. Li/Li$^+$), more desirably to be 2V (vs. Li/Li$^+$).

It is desirable for the negative electrode active material capable of inserting lithium element or Li ions under the potential within a range of 0.2 to 3V (vs. Li/Li$^+$) to be formed of a metal oxide, a metal sulfide, a metal nitride or an alloy.

The metal oxides used as the active material of the negative electrode include, for example, a titanium-containing composite oxide such as TiO$_2$, TiO$_2$—P$_2$O$_5$, TiO$_2$—V$_2$O$_5$, TiO$_2$—P$_2$O$_5$—SnO$_2$, or TiO$_2$—P$_2$O$_5$-MeO (Me is at least one element selected from the group consisting of Cu, Ni and Fe); a lithium titanium oxide and having the Spinel structure such as Li$_{4+x}$Ti$_5$O$_{12}$ (−1≤x≤3) or Li$_{2+x}$Ti$_3$O$_7$ (−1≤x≤3); a tungsten oxide such as WO$_3$; an amorphous tin oxide such as SnB$_{0.4}$P$_{0.6}$O$_{3.1}$; a tin-silicon oxide such as SnSiO$_3$; and silicon oxide (SiO). Particularly, it is desirable to use a lithium titanium oxide and/or a titanium-containing composite oxide as the negative electrode active material. The lithium titanium oxide and titanium-containing composite oxide can insert and/or release lithium ions.

It is desirable for the titanium-containing composite oxide to contain at least one element selected from the group consisting of P, V, Sn, Cu, Ni and Fe. The composite metal oxide containing Ti and at least one element selected from the group consisting of P, V, Sn, Cu, Ni and Fe include, for example, TiO$_2$—P$_2$O$_5$, TiO$_2$—V$_2$O$_5$, TiO$_2$—P$_2$O$_5$—SnO$_2$, TiO$_2$—P$_2$O$_5$-MeO, or TiO$_2$—P$_2$O$_5$—CuO. It is desirable for the microstructure of the titanium-containing composite oxide to contain a crystal phase and/or a crystallite phase, and an amorphous phase, or to contain a single phase formed of an amorphous phase. The titanium-containing composite oxide having the particular microstructure permits improving the charge-discharge cycle characteristics of the nonaqueous electrolyte battery.

The metal sulfides used as the negative electrode active material include, for example, titanium sulfide such as TiS$_2$, molybdenum sulfide such as MoS$_2$, and iron sulfides such as FeS, FeS$_2$, and Li$_x$FeS$_2$.

The metal nitride used as the negative electrode active material includes, for example, lithium-cobalt nitride such as Li$_x$Co$_y$N (0<x<4, 0<y<0.5).

The average primary particle diameter of the negative electrode active material is defined as described previously. If the specific surface area of the negative electrode is increased to 3 to 50 m$^2$/g by using the primary particles having an average particle diameter exceeding 1 μm, it is unavoidable for the porosity of the negative electrode to be lowered. It should be noted, however, that, if the average primary particle diameter is excessively small, the primary particles tend to be agglomerated easily, and the nonaqueous electrolyte tends to be locally concentrated mainly on the side of the negative electrode, with the result that the nonaqueous electrolyte tends to be depleted in the positive electrode. Such being the situation, it is desirable for the lower limit of the average primary particle diameter of the negative electrode active material to be set at 0.001 μm.

It is desirable for the negative electrode active material to have an average primary particle diameter not larger than 1 μm and a specific surface area within a range of 3 to 200 m$^2$/g as determined by the BET method utilizing the N$_2$ adsorption. In this case, the affinity of the negative electrode with the nonaqueous electrolyte can be further enhanced.

The specific surface area of the negative electrode is defined to fall within the range described above. If the specific surface area of the negative electrode is smaller than 3 m$^2$/g, the agglomeration of the primary particles of the negative electrode active material is rendered prominent so as to lower the affinity of the negative electrode with the nonaqueous electrolyte and to increase the interface resistance of the negative electrode. It follows that the high-rate characteristics and the charge-discharge cycle characteristics of the battery are lowered. On the other hand, if the specific surface area of the negative electrode exceeds 50 $m^2/g$, the nonaqueous electrolyte is distributed in a larger amount in the negative electrode so as to cause the deficiency of the nonaqueous electrolyte in the positive electrode, with the result that it is impossible to improve the high-rate characteristics and the charge-discharge cycle characteristics of the battery. It is more desirable for the specific surface area of the negative electrode to fall within a range of 5 to 50 $m^2/g$. Incidentally, the specific surface area of the negative electrode represents the specific surface area per 1 g of the negative electrode layer (excluding the weight of the current collector). Also, the negative electrode layer noted above denotes a porous layer supported on the current collector and including the active material of the negative electrode, the conductive agent and the binder.

It is desirable for the porosity of the negative electrode excluding the current collector to fall within a range of 20 to 50%. In this case, it is possible to obtain a negative electrode excellent in its affinity with the nonaqueous electrolyte and having a high density. It is more desirable for the porosity noted above to fall within a range of 25 to 40%.

It is desirable for the current collector of the negative electrode to be formed of aluminum foil or aluminum alloy foil. It is also desirable for the negative electrode current collector to have an average crystal grain size not larger than 50 μm. In this case, the mechanical strength of the current collector can be drastically increased so as to make it possible to increase the density of the negative electrode by applying the pressing under a high pressure to the negative electrode. As a result, the battery capacity can be increased. Also, since it is possible to prevent the dissolution and corrosion deterioration of the negative electrode current collector over a long over-discharge cycle under an environment of a high temperature not lower than, for example, 40° C., it is possible to suppress the elevation in the impedance of the negative electrode. Further, it is possible to improve the high-rate characteristics, the rapid charging properties, and the charge-discharge cycle characteristics of the battery. It is more desirable for the average crystal grain size of the negative electrode current collector to be not larger than 30 μm, furthermore desirably, not larger than 5 μm.

The average crystal grain size can be obtained as follows. Specifically, the texture of the current collector surface is observed with an electron microscope so as to obtain the number n of crystal grains present within an area of 1 mm×1 mm. Then, the average crystal grain area S is obtained from the formula "$S=1\times10^6/n$ ($\mu m^2$)", where n denotes the number of crystal grains noted above. Further, the average crystal grain size d (μm) is calculated from the area S by formula (I) given below:

$$d=2(S/\pi)^{1/2} \quad (1)$$

The aluminum foil or the aluminum alloy foil having the average crystal grain size not larger than 50 μm can be complicatedly affected by many factors such as the composition of the material, the impurities, the process conditions, the history of the heat treatments and the heating conditions such as the annealing conditions, and the crystal grain size can be adjusted by an appropriate combination of the factors noted above during the manufacturing process.

It is desirable for the aluminum foil or the aluminum alloy foil to have a thickness not larger than 20 μm, preferably not larger than 15 μm. Also, it is desirable for the aluminum foil to have a purity not lower than 99.99%. Further, it is desirable for the aluminum alloy to contain, for example, magnesium, zinc and silicon. On the other hand, it is desirable for the content of the transition metals such as iron, copper, nickel and chromium in the aluminum alloy to be not higher than 100 ppm.

It is possible to use, for example, a carbon material as the conductive agent. The carbon material includes, for example, acetylene black, carbon black, coke, a carbon fiber, graphite, an aluminum powder and TiO. It is more desirable for the conductive agent to be formed of coke obtained by the heat treatment at 800° C. to 2,000° C. and having an average particle diameter not larger than 10 μm, graphite, a TiO powder, and a carbon fiber having an average fiber diameter not larger than 1 μm. Further, it is desirable for the carbon material to have a specific surface area not smaller than 10 $m^2/g$ as determined by the BET method utilizing the adsorption of $N_2$.

The binder includes, for example, polytetrafluoroethylene (PTFE), polyvinylidene fluoride (PVdF), a fluorinated rubber, a styrene-butadiene rubber, and a core shell binder.

Concerning the mixing ratio of the active material, the conductive agent and the binder contained in the negative electrode, it is desirable for the active material of the negative electrode to be contained in an amount of 80 to 95% by weight, for the conductive agent to be contained in an amount of 3 to 18% by weight, and for the binder to be contained in an amount of 2 to 7% by weight.

The negative electrode is manufactured by suspending the active material of the negative electrode, the conductive agent and the binder in an appropriate solvent, followed by coating a current collector with the resultant suspension and subsequently drying and pressing the current collector coated with the suspension. In manufacturing the negative electrode, the primary particles of the negative electrode active material are uniformly dispersed in the solvent under the state that the addition amount of the binder is small. If a large amount of the binder is dispersed in the solvent, the dispersion capability of the primary particles noted above certainly tends to be improved. However, the surface of the primary particle tends to be covered with the binder, with the result that the specific surface area of the negative electrode is decreased. On the other hand, in the case of adding a small amount of the binder, the primary particles tend to be agglomerated. Therefore, the agglomeration of the primary particles is suppressed by controlling the stirring conditions of the suspension such as the rotating speed of a ball mill, the stirring time and the stirring temperature. As a result, the fine particles can be dispersed uniformly so as to make it possible to obtain a negative electrode that is desirable in the present invention. Further, if the conductive agent is added in a large amount, difficulties are brought about, even if the addition amount of the binder and the stirring conditions fall within appropriate ranges. Specifically, in the case of adding a large amount of the conductive agent, the surface of the negative electrode active material tends to be covered with the conductive agent and the pores on the surface of the negative electrode tend to be decreased so as to decrease the specific surface area of the negative electrode. On the other hand, if the conductive agent is added in a small amount, the active material of the negative electrode tends to be pulverized so as to increase the specific surface area of the negative electrode. Alternatively, if the conductive agent is added in a small amount, the dispersion capability of the active material of the negative electrode may be lowered so as to decrease the specific surface area of the negative electrode. Further, it is possible for the specific surface area of the negative electrode to be affected not only by the addition amount of the conductive agent but also by the average primary particle diameter and the specific surface area of the conductive agent. It is desirable for the conductive agent to have an average primary particle diameter not larger than the average primary particle diameter of the negative electrode active material and to have a specific surface area larger than that of the negative electrode active material.

2) Positive Electrode:

The positive electrode includes a positive electrode current collector and a positive electrode layer supported on one or both surfaces of the current collector. The positive electrode layer contains an active material, a conductive agent and a binder.

Various oxides and sulfides can be used as the active material of the positive electrode. The oxides and sulfides as the active material of the positive electrode include, for example, manganese dioxide ($MnO_2$), iron oxide, copper oxide, nickel oxide, a lithium-manganese composite oxide such as $Li_xMn_2O_4$ or $Li_xMnO_2$, a lithium-nickel composite oxide such as $Li_xNiO_2$, a lithium-cobalt composite oxide such as $Li_xCoO_2$, a lithium-nickel-cobalt composite oxide such as $Li_xNi_{1-y}Co_yO_2$, a lithium-manganese-cobalt composite oxide such as $Li_xMn_yCo_{1-y}O_2$, a Spinel-type lithium-manganese-nickel composite oxide such as $Li_xMn_{2-y}Ni_yO_4$ ($0 \le x \le 1$, $0.4 \le y \le 1$), a lithium-phosphorus oxide having an olivine structure such as $Li_xFePO_4$, $Li_xFe_{1-y}Mn_yPO_4$, $Li_xVPO_4F$, or $Li_xCoPO_4$, iron sulfate ($Fe_2(SO_4)_3$), a vanadium oxide such as $V_2O_5$, and a lithium-nickel-cobalt-manganese composite oxide having a laminar crystal structure. It is also possible to use a conductive polymer material such as polyaniline or polypyrrole as the active material of the positive electrode. It is also possible to use an organic or inorganic material including a disulfide based polymer material, sulfur (S), and a fluorinated carbon as the active material of the positive electrode. Incidentally, it is desirable for x and y in the chemical formulas given above to fall within a range of 0 to 1 unless otherwise stipulated.

It is desirable for the molar ratios of a, b, c, and d of the lithium-nickel-cobalt-manganese composite oxide represented by $Li_aNi_bCo_cMn_dO_2$ to be $0 \le a \le 1.1$, $0.1 \le b \le 0.5$, $0 \le c \le 0.9$, and $0.1 \le d \le 0.5$.

It is more desirable to use, for example, a lithium-nickel-cobalt-manganese composite oxide having a laminar crystal structure, a lithium-manganese composite oxide, a lithium-nickel composite oxide, a lithium-cobalt composite oxide, a lithium-nickel-cobalt composite oxide, a Spinel-type lithium-manganese-nickel composite oxide, a lithium-manganese-cobalt composite oxide, and lithium iron phosphate as the positive electrode active material for the secondary battery. In the case of using these positive electrode active materials, it is possible to obtain a high battery voltage.

Particularly, in the case of using a nonaqueous electrolyte containing an ionic liquid, it is desirable to use lithium iron phosphate, $Li_xVPO_4F$, a lithium-manganese composite oxide, a lithium-nickel composite oxide, or a lithium-nickel-cobalt composite oxide because the cycle life of the battery can be prolonged in this case. It should be noted in this connection that the active material of the positive electrode noted above is less reactive with the ionic liquid so as to prolong the cycle life of the battery.

Also, the positive electrode active material for a primary battery includes, for example, manganese dioxide, iron oxide, copper oxide, iron sulfide, and a fluorinated carbon.

The conductive agent contained in the positive electrode includes, for example, acetylene black, carbon black and graphite.

Further, the binder contained in the positive electrode includes, for example, polytetrafluoro-ethylene (PTFE), polyvinylidene fluoride (PVdF) and a fluorinated rubber.

Concerning the mixing ratio of the active material, the conductive agent and the binder contained in the positive electrode, it is desirable for the positive electrode active material to be contained in an amount of 80 to 95% by weight, for the conductive agent to be contained in an amount of 3 to 19% by weight, and for the binder to be contained in an amount of 1 to 7% by weight.

The positive electrode can be prepared by, for example, suspending the positive electrode active material, the conductive agent and the binder in an appropriate solvent, followed by coating a current collector formed of an aluminum foil or an aluminum alloy foil with the resultant suspension and subsequently drying and pressing the current collector coated with the suspension.

It is desirable for the aluminum foil or the aluminum alloy foil forming the positive electrode current collector to have an average crystal grain size not larger than 50 μm like the foil forming the negative electrode current collector. It is more desirable for the average crystal grain size noted above to be not larger than 30 μm, and furthermore desirably not larger than 5 μm. Where the average crystal grain size of the aluminum foil or the aluminum alloy foil forming the positive electrode current collector is not larger than 50 μm, the mechanical strength of the aluminum foil or the aluminum alloy foil can be drastically increased so as to make it possible to press the positive electrode with a high pressure. It follows that the density of the positive electrode can be increased so as to increase the battery capacity.

The aluminum foil or the aluminum alloy foil having the average crystal grain size not larger than 50 μm can be affected in a complicated fashion by many factors such as the composition of the material, the impurities, the process conditions, the history of the heat treatments and the heating conditions such as the annealing conditions, and the crystal grain size can be adjusted by an appropriate combination of the factors noted above during the manufacturing process.

It is desirable for the aluminum foil or the aluminum alloy foil to have a thickness not larger than 20 μm, preferably not larger than 15 μm.

A separator can be arranged between the positive electrode and the negative electrode. It is possible for the separator to be formed of, for example, a synthetic resin unwoven fabric, a polyethylene porous film, a polypropylene porous film, or a cellulose unwoven fabric.

3) Nonaqueous Electrolyte:

The nonaqueous electrolyte includes, for example, a liquid electrolyte prepared by dissolving a lithium salt in an organic solvent, a gel-like electrolyte including the liquid electrolyte and a polymer material, which are in the form of a composite material, and a solid electrolyte including a lithium salt and a polymer material, which are in the form of a composite material. The polymer materials include, for example, polyvinylidene fluoride (PVdF), polyacrylonitrile (PAN) and polyethylene oxide (PEO).

It is desirable for the nonaqueous electrolyte to contain an ionic liquid (i.e., a room temperature molten salt). It is desirable for the ionic liquid to be nonvolatile and incombustible.

The lithium salt used as the electrolyte includes, for example, lithium perchlorate ($LiClO_4$), lithium hexafluoro phosphate ($LiPF_6$), lithium tetrafluoro borate ($LiBF_4$), lithium hexafluoro arsenate ($LiAsF_6$), lithium trifluoro meta-sulfonate ($LiCF_3SO_3$), bistrifluoromethyl sulfonylimide lithium [$LiN(CF_3SO_2)_2$], $LiN(C_2F_5SO_2)_2$, $Li(CF_3SO_2)_3C$ and $LiB[(OCO)_2]_2$. It is possible to use a single kind of the electrolyte or a plurality of different kinds of the electrolyte simultaneously in combination.

It is desirable for the electrolyte to be dissolved in an organic solvent in an amount of 0.5 to 2.5 mol/L.

The organic solvent noted above includes, for example, cyclic carbonates such as propylene carbonate (PC), ethylene carbonate (EC); linear carbonates such as diethyl carbonate (DEC), dimethyl carbonate (DMC), and methyl ethyl carbonate (MEC); linear ethers such as dimethoxy ethane (DME), and diethoxy ethane (DEE); cyclic ethers such as tetrahydrofuran (THF), dioxolane (DOX); as well as γ-butyrolactone (GBL), acetonitrile (AN), and sulfolane (SL). These organic solvents can be used singly or in the form of a mixture of a plurality of the organic solvents exemplified above. Particularly, it is desirable to use at least one kind of the organic solvent selected from the group consisting of PC, EC, DEC, and GBL. In this case, it is possible to improve the high-rate characteristics or the charge-discharge cycle life of the secondary battery.

The nonaqueous electrolyte that contains the ionic liquid will now be described.

The molten salt that can melted at least partially under the room temperature so as to form a liquid phase is defined as the ionic liquid. In this case, the term "room temperature" denotes the temperature range 60° C. or less, preferably, −20° C. or more and 60° C. or less.

It is desirable for an ionic liquid to contain lithium ions, organic cations and anions. It is desirable for the ionic liquid noted above to have a liquid phase under the temperature not higher than the room temperature.

The organic cation noted above includes alkyl imidazolium ion and/or quaternary ammonium ion. Each of the alkyl imidazolium ion and the quaternary ammonium ion has the skeletal structure given below:

It is desirable to use, for example, a dialkyl imidazolium ion, a trialkyl imidazolium ion and a tetraalkyl imidazolium ion as the alkyl imidazolium ion noted above. Also, it is desirable to use 1-methyl-3-ethyl imidazolium ion (MEI$^+$) as the dialkyl imidazolium ion, to use 1,2-diethyl-3-propyl imidazolium ion (DMPI$^+$) as the trialkyl imidazolium ion, and to use 1,2-diethyl-3,4(5)-dimethyl imidazolium ion as the tetraalkyl imidazolium ion.

It is desirable to use, for example, a tetraalkyl ammonium ion or a cyclic ammonium ion as the quaternary ammonium ion noted above. Also, it is desirable to use a dimethyl ethyl methoxy ethyl ammonium ion, a dimethyl ethyl methoxy methyl ammonium ion, a dimethyl ethyl ethoxy ethyl ammonium ion, and a trimethyl propyl ammonium ion as the tetraalkyl ammonium ion.

It is possible to set the melting point of the nonaqueous electrolyte at 100° C. or less, preferably at 20° C. or less, by using the alkyl imidazolium ion or the quaternary ammonium ion noted above. Further, the reactivity of the nonaqueous electrolyte with the negative electrode can be lowered in the case of using the alkyl imidazolium ion or the quaternary ammonium ion noted above.

It is desirable to set the lithium ion concentration at 20 mol % or less, preferably within a range of 1 to 10 mol %. It is possible to provide easily an ionic liquid even under a temperature not higher than 20° C. by setting the lithium ion concentration to fall within the range noted above. It is also possible to lower the viscosity even under the temperature not higher than the room temperature so as to increase the ionic conductivity.

The anion noted above includes, for example, $BF_4^-$, $PF_6^-$, $AsF_6^-$, $ClO_4^-$, $CF_3SO_3^-$, $CF_3COO^-$, $CH_3COO^-$, $CO_3^{2-}$, $N(CF_3SO_2)_2^-$, $N(C_2F_5SO_2)_2^-$, and $(CF_3SO_2)_3C^-$. It is desirable for a plurality of these anions to be present together. Where a plurality of these anions are present together, it is possible to form easily an ionic liquid having a melting point not higher than 20° C. The anions that are used more preferably include $BF_4^-$, $CF_3SO_3^-$, $CF_3COO^-$, $CH_3COO^-$, $CO_3^{2-}$, $N(CF_3SO_2)_2^-$, $N(C_2F_5SO_2)_2^-$, and $(CF_3SO_2)_3C^-$. In the case of using any of these anions, it is possible to form easily an ionic liquid under temperatures not higher than 0° C.

A metallic container or a laminate film container can be used as a case for housing the positive electrode, the negative electrode and the nonaqueous electrolyte.

The metallic container noted above can be a metal can formed of aluminum, an aluminum alloy, iron or stainless steel and having a prismatic shape or having a cylindrical shape. It is desirable for the case to have a thickness not larger than 0.5 mm, more preferably not larger than 0.2 mm.

The laminate film used for forming the case includes, for example, a multi-layered film in which a metal foil is covered with a resin film. A polymer material such as polypropylene (PP), polyethylene (PE), nylon, or polyethylene terephthalate (PET) can be used for forming the resin film covering the metal foil. It is desirable for the laminate film to have a thickness not larger than 0.2 mm.

It is desirable for the metal can formed of aluminum or an aluminum alloy to have an average crystal grain size not larger than 50 μm, more preferably not larger than 30 μm, and furthermore preferably not larger than 5 μm. Where the average crystal grain size is not larger than 50 μm, it is possible to increase drastically the mechanical strength of the metal can formed of aluminum or an aluminum alloy so as to make it possible to decrease the thickness of the metal can used as the case. As a result, it is possible to realize a battery that is light in weight, high in output, excellent in reliability over a long period, and adapted for mounting on a vehicle. It is desirable for the aluminum foil to have a purity of at least 99.99%. Further, it is desirable for the aluminum alloy to contain, for example, magnesium, zinc and silicon. On the other hand, it is desirable for the content of the transition metals such as iron, copper, nickel and chromium in the aluminum alloy to be not higher than 100 ppm. In this case, it is possible to improve drastically the battery in respect of weight reduction, reliability for a long time in a high-temperature environment, and heat dissipating properties.

FIG. 1 exemplifies the construction of a nonaqueous electrolyte battery according to one embodiment of the present invention.

As shown in the drawing, the nonaqueous electrolyte battery comprises an electrode group 1 of a laminate structure consisting of a positive electrode 2, a negative electrode 3, and a separator 4 interposed between the positive electrode 2 and the negative electrode 3. The electrode group 1 is prepared by spirally winding the laminate structure noted above such that the wound laminate structure has a flattened shape, followed by pressing the flattened laminate structure under heat. It is possible for the positive electrode 2, the negative electrode 3, and the separator 4 included in the electrode group 1 to be bonded to each other by using a polymer material having an adhesivity so as to form an integral structure. A band-like positive electrode terminal 5 is electrically connected to the positive electrode 2. On the other hand, a band-like negative electrode terminal 6 is electrically connected to the negative electrode 3. The electrode group 1 of the particular construction is housed in a case 7 formed of a laminate film under the state that the edge portions of the positive electrode terminal 5 and the negative electrode terminal 6 protrude from the case 7. Incidentally, the case 7 formed of a laminate film is sealed by means of heat sealing.

Some Examples of the present invention will now be described in detail with reference to FIG. 1. Needless to say, the present invention is not limited to these Examples.

Example 1

For preparing a positive electrode, a slurry was prepared by dispersing in an n-methylpyrrolidone (NMP) solvent a mixture consisting of a Spinel-type lithium-manganese-nickel composite oxide ($LiMn_{1.5}Ni_{0.5}O_4$), which was used as the active material of the positive electrode, a graphite powder, which was used as a conductive agent, in an amount of 8% by weight based on the amount of the entire positive electrode, and PVdF, which was used as a binder, in an amount of 5% by weight based on the amount of the entire positive electrode. Then, an aluminum foil used as a current collector and having a purity of 99.99%, a thickness of 15 μm, and an average crystal grain size of 10 μm was coated with the slurry thus prepared, followed by drying and pressing the aluminum foil coated with the slurry so as to obtain a positive electrode having an electrode density of 3.5 $g/cm^3$.

Also, for preparing a negative electrode, a dispersion was prepared by dispersing in an n-methyl pyrrolidone (NMP) solvent a mixture consisting of a powder of a Spinel-type lithium titanate ($Li_4Ti_5O_{12}$), which was used as the active material of the negative electrode, a coke powder having 0.4 μm of an average primary particle diameter and 50 $m^2/g$ of the BET specific surface area, an acetylene black powder, and PVdF used as a binder, which were mixed in a weight ratio of 90:6:2:2. The Spinel-type lithium titanate powder had 0.3 μm of an average primary particle diameter, 15 $m^2/g$ of the BET specific surface area and 1.55V (vs. $Li/Li^+$) of the Li insertion potential. Then, the dispersion was stirred for 2 hours by using a ball mill, which was rotated at a rotating speed of 1,000 rpm, so as to obtain a slurry. Further, an aluminum foil used as a negative electrode current collector and having a purity of 99.99%, a thickness of 10 μm, and an average crystal grain size of 10 μm was coated with the slurry thus prepared, followed by drying and pressing the aluminum foil coated with the slurry so as to obtain a negative electrode. The porosity of the negative electrode excluding the current collector was found to be 35%. Also, the BET specific surface area of the negative electrode, i.e., the surface area per gram of the negative electrode layer, was found to be 10 $m^2/g$.

The primary particle of the negative electrode active material was measured by using Laser Diffraction Particle Size Analyzer (SHIMADZU SALD-300). To be more specific, about 0.1 g of a sample, a surfactant, and 1 to 2 mL of a distilled water were put in a beaker, and the resultant mixture was stirred sufficiently. Then, the stirred mixture was put in a stirring water vessel, and the luminosity distribution was measured every 2 seconds and measured 64 times in total so as to analyze the data on the particle size distribution, thereby obtaining the average primary particle diameter.

The BET specific surface area utilizing the $N_2$ adsorption was measured under the conditions given below for each of the negative electrode active material and the negative electrode.

Specifically, prepared was 1 g of a powdery negative electrode active material as a sample of the negative electrode active material. As a sample of the negative electrode, prepared were two pieces each sized at 2×2 $cm^2$, which were cut out from the negative electrode. The specific surface area was measured by using a BET specific surface area measuring apparatus manufactured by Yuasa Ionics Inc. in which a nitrogen gas was used as an adsorption gas.

Incidentally, the porosity of the negative electrode was calculated on the basis of the difference in volume between the negative electrode layer that was tested and the negative electrode layer at the time when the porosity was 0%. In this calculation, the difference noted above was regarded as the pore volume. Incidentally, where the negative electrode layers were formed on both surfaces of the current collector, the volume of the negative electrode layer used for the calculation noted above represents the sum of the volumes of the negative electrode layers on both surfaces of the current collector.

On the other hand, a separator formed of a porous polyethylene film having a thickness of 12 μm was put in direct contact with the positive electrode in a manner to cover the positive electrode, and the negative electrode was positioned to face the positive electrode with the separator interposed therebetween so as to obtain a laminate structure. The laminate structure thus obtained was spirally wound so as to prepare an electrode group. Further, the electrode group was pressed in a manner to have a flattened shape, followed by housing the flattened electrode group in a case formed of an aluminum-containing laminate film having a thickness of 0.1 mm.

On the other hand, a liquid nonaqueous electrolyte (nonaqueous electrolysis solution) was prepared by dissolving lithium tetrafluoro borate ($LiBF_4$) used as an electrolyte in a mixed solvent consisting of ethylene carbonate (EC) and γ-butyrolactone (BL), which were mixed at a volume ratio of 25:75. The electrolyte was dissolved in the mixed solvent in an amount of 1.5 mol/L. The nonaqueous electrolyte thus prepared was poured into the electrode group housed in the case of the laminate film so as to manufacture a thin nonaqueous electrolyte battery constructed as shown in FIG. 1 and sized at 3.8 mm in thickness, 35 mm in width and 63 mm in height.

Example 2

A thin nonaqueous electrolyte battery was manufactured as in Example 1, except that the average primary particle diameter and the specific surface area of the active material of the negative electrode were set as shown in Table 1, and that the slurry used for preparing the negative electrode was stirred for 2 hours with the rotating speed of the ball mill set at 1,500 rpm so as to obtain the negative electrode having the porosity and the specific surface area as shown in Table 1.

Example 3

A thin nonaqueous electrolyte battery was manufactured as in Example 1, except that the average primary particle diameter and the specific surface area of the negative electrode active material were set as shown in Table 1, and that the slurry used for preparing the negative electrode was stirred for 4 hours with the rotating speed of the ball mill set at 1,500 rpm so as to obtain the negative electrode having the porosity and the specific surface area as shown in Table 1.

Examples 4 to 6

A thin nonaqueous electrolyte battery was manufactured as in Example 1, except that the average primary particle diameter and the specific surface area of the negative electrode active material and the porosity and the specific surface area of the negative electrode were set as shown in Table 1.

Example 7

A thin nonaqueous electrolyte battery was manufactured as in Example 3, except that an ionic liquid having 1-methyl-3-ethyl imidazolium ion ($MEI^+$), $Li^+$ and $BF_4^-$, the molar ratio of ($MEI^+$), $Li^+$ and $BF_4^-$ being 40:10:50, was used for preparing the nonaqueous electrolyte.

Example 8

A thin nonaqueous electrolyte battery was manufactured as in Example 7, except that the dimethyl ethyl methoxy methyl ammonium ion was used in place of the 1-methyl-3-ethyl imidazolium ion ($MEI^+$) contained in the nonaqueous electrolyte.

Example 9

A thin nonaqueous electrolyte battery was manufactured as in Example 3, except that lithium-cobalt oxide ($LiCoO_2$) was used as the active material of the positive electrode.

Example 10

A liquid nonaqueous electrolyte (nonaqueous electrolysis solution) was prepared by dissolving lithium tetrafluoro borate ($LiBF_4$) used as the electrolyte in a mixed solvent consisting of ethylene carbonate (EC) and γ-butyrolactone (BL), the mixing ratio in volume being 25:75, in an amount of 2 mol/L. A thin nonaqueous electrolyte battery was manufactured as in Example 1, except that the nonaqueous electrolyte thus prepared was used.

Example 11

A thin nonaqueous electrolyte battery was manufactured as in Example 1, except that $LiFePO_4$ was used as the active material of the positive electrode, and that the nonaqueous electrolyte used was equal in composition to that used in Example 7.

Example 12

A liquid nonaqueous electrolyte (nonaqueous electrolysis solution) was prepared by dissolving $LiPF_6$ used as an electrolyte in a mixed solvent consisting of ethylene carbonate (EC) and diethyl carbonate (DEC), the mixing ratio in volume being 10:90, in an amount of 1.0 mol/L. A thin nonaqueous electrolyte battery was manufactured as in Example 1, except that used was the nonaqueous electrolyte thus prepared.

Example 13

Used was $LiNi_{1/3}Co_{1/3}Mn_{1/3}O_2$ as the active material of the positive electrode. Also, a liquid nonaqueous electrolyte (nonaqueous electrolysis solution) was prepared by dissolving $LiPF_6$ used as an electrolyte in a mixed solvent consisting of ethylene carbonate (EC) and diethyl carbonate (DEC), the mixing ratio being 40:60, in an amount of 1.0 mol/L. A thin nonaqueous electrolyte battery was manufactured as in Example 1, except that used were the positive electrode active material and the nonaqueous electrolyte described above.

Example 14

Used was $LiNi_{1/3}Co_{1/3}Mn_{1/3}O_2$ as the active material of the positive electrode. Also, an ionic liquid containing 1-methyl-3-ethyl imidazolium ion ($MEI^+$), $Li^+$ and $BF_4^-$, the molar ratio of ($MEI^+$), $Li^+$ and $BF_4^-$ being 30:20:50, was used as the nonaqueous electrolyte. A thin nonaqueous electrolyte battery was manufactured as in Example 1, except that used were the positive electrode active material and the nonaqueous electrolyte described above.

Examples 15

A thin nonaqueous electrolyte battery was manufactured as in Example 1, except the negative electrode is a composite metal oxide containing Ti, P, Sn, Ni, and Cu. The composite metal oxide is represented by $TiO_2$—$P_2O_5$—$SnO_2$—$NiO$—$CuO$. And the composite metal oxide has a Li insertion potential range of 1 to 2V (vs. $Li/Li^+$). The composite metal oxide includes a crystallite phase of $TiO_2$ and an amorphous phase.

Comparative Example 1

A thin nonaqueous electrolyte battery was manufactured as in Example 1, except that the average primary particle diameter and the specific surface area of the negative electrode active material were set as shown in Table 1, and that the slurry used for obtaining the negative electrode was stirred for one hour with the rotating speed of the ball mill set at 500 rpm so as to obtain the negative electrode having the porosity and the specific surface area as shown in Table 1.

Comparative Examples 2 to 5

A thin nonaqueous electrolyte battery was manufactured as in Example 1, except that the average primary particle diameter and the specific surface area of the negative electrode active material and the porosity and the specific surface area of the negative electrode were set as shown in Table 1.

Comparative Example 6

For preparing a negative electrode, a dispersion was prepared by dispersing a mixture consisting of 94% by weight of a powder of meso-phase pitch based carbon fiber subjected to a heat treatment at 3,000° C. and having 15 μm of an average particle diameter, 1 $m^2/g$ of a BET specific surface area, and 0.15V (vs. $Li/Li^+$) of the Li insertion potential, and 6% by weight of polyvinylidene fluoride (PVdF) in an n-methyl pyrrolidone (NMP) solvent. Then, the dispersion was stirred for 2 hours by using a ball mill, which was rotated at a rotating speed of 1,000 rpm, so as to obtain a slurry. Further, a copper foil used as a current collector of the negative electrode and having a thickness of 12 μm was coated with the slurry thus prepared, followed by drying and pressing the copper foil coated with the slurry so as to obtain a band-like negative electrode having an electrode density of 1.4 $g/cm^3$. The porosity and the specific surface area of the negative electrode thus obtained are shown in Table 1.

A thin nonaqueous electrolyte battery was manufactured as in Example 1, except that used were a liquid nonaqueous electrolyte similar to that referred to in Example 10 and an active material of the positive electrode similar to that referred to in Example 9.

Comparative Example 7

A negative electrode was prepared as in Example 1, except that the average primary particle diameter and the specific surface area of the negative electrode active material were changed as shown in Table 1, and that the linear pressure applied by a roller having a diameter of 20 cm was set at 1.5 ton/cm, which was 3 times as high as that in Example 1. Table 1 also shows the porosity and the specific surface area of the negative electrode thus obtained.

A thin nonaqueous electrolyte battery was manufactured as in Example 1, except that used was the negative electrode thus prepared.

Each of the nonaqueous electrolyte batteries manufactured in Examples 1 to 15 and Comparative Examples 1 to 7 excluding those manufactured in Examples 9, 11 and Comparative Example 6 was subjected to a cycle test. In the cycle test, the battery was charged for 60 minutes under a constant current of 0.5 A so as to elevate the battery voltage to 3.4V, followed by discharging the battery to 0V under a constant current of 0.5 A. The charge-discharge operation of the battery noted above was repeatedly carried out under an environment of 20° C. Also measured were the discharge initial capacity under a discharge current of 0.2 A and the capacity retention rate under a discharge current of 1 A (i.e., the capacity retention rate on the basis that the capacity under a discharge current of 0.2 A was set at 100) under an environment of 20° C. The cycle life during the over-discharge cycle test was denoted by the number of charge-discharge cycles having 80% of the capacity retention rate based on the initial capacity.

A cycle test, in which the battery was charged for 60 minutes under a current of 0.5 A so as to elevate the battery voltage to 2.8V, followed by discharging the battery to 0V under a current of 0.5 A, was repeatedly applied under an environment of 20° C. to the nonaqueous electrolyte battery manufactured in each of Examples 9 and 11. Also measured were the discharge initial capacity under a discharge current of 0.2 A and the capacity retention rate under a discharge current of 1 A (i.e., the capacity retention rate on the basis that the capacity under a discharge current of 0.2 A was set at 100) under an environment of 20° C. The cycle life during the over-discharge cycle test was denoted by the number of charge-discharge cycles having 80% of the capacity retention rate based on the initial capacity.

On the other hand, a cycle test, in which the battery was charged for 60 minutes under a current of 0.5 A so as to elevate the battery voltage to 4.2V, followed by discharging the battery to 0V under a current of 0.5 A, was repeatedly applied under an environment of 20° C. to the nonaqueous electrolyte battery manufactured in Comparative Example 6. Also measured were the discharge initial capacity under a discharge current of 0.2 A and the capacity retention rate under a discharge current of 1 A (i.e., the capacity retention rate on the basis that the capacity under a discharge current of 0.2 A was set at 100) under an environment of 20° C. The cycle life during the over-discharge cycle test was denoted by the number of charge-discharge cycles having 80% of the capacity retention rate based on the initial capacity.

Table 1 shows the results of these measurements.

TABLE 1

| | Positive electrode active material | Negative electrode active material Average primary particle diameter (μm) | Negative electrode active material Specific surface area (m$^2$/g) | Negative electrode porosity (%) | Negative electrode specific surface area (m$^2$/g) |
|---|---|---|---|---|---|
| Example 1 | LiMn$_{1.5}$Ni$_{0.5}$O$_4$ | 0.3 | 15 | 35 | 10 |
| Example 2 | LiMn$_{1.5}$Ni$_{0.5}$O$_4$ | 0.1 | 20 | 40 | 20 |
| Example 3 | LiMn$_{1.5}$Ni$_{0.5}$O$_4$ | 0.05 | 40 | 50 | 50 |
| Example 4 | LiMn$_{1.5}$Ni$_{0.5}$O$_4$ | 1.0 | 4 | 35 | 3 |
| Example 5 | LiMn$_{1.5}$Ni$_{0.5}$O$_4$ | 0.1 | 25 | 35 | 30 |
| Example 6 | LiMn$_{1.5}$Ni$_{0.5}$O$_4$ | 0.5 | 8 | 35 | 6 |
| Example 7 | LiMn$_{1.5}$Ni$_{0.5}$O$_4$ | 0.05 | 40 | 50 | 50 |
| Example 8 | LiMn$_{1.5}$Ni$_{0.5}$O$_4$ | 0.05 | 40 | 50 | 50 |
| Example 9 | LiCoO$_2$ | 0.05 | 40 | 50 | 50 |
| Example 10 | LiMn$_{1.5}$Ni$_{0.5}$O$_4$ | 0.3 | 15 | 35 | 10 |
| Example 11 | LiFePO$_4$ | 0.3 | 15 | 35 | 10 |
| Example 12 | LiMn$_{1.5}$Ni$_{0.5}$O$_4$ | 0.3 | 15 | 35 | 10 |
| Example 13 | LiNi$_{1/3}$Co$_{1/3}$Mn$_{1/3}$O$_2$ | 0.3 | 15 | 35 | 10 |
| Example 14 | LiNi$_{1/3}$Co$_{1/3}$Mn$_{1/3}$O$_2$ | 0.3 | 15 | 35 | 10 |
| Example 15 | LiMn$_{1.5}$Ni$_{0.5}$O$_4$ | 0.3(TiO$_2$-based) | 15(TiO$_2$-based) | 35 | 10 |
| Comparative Example 1 | LiMn$_{1.5}$Ni$_{0.5}$O$_4$ | 1 | 2 | 35 | 1 |
| Comparative Example 2 | LiMn$_{1.5}$Ni$_{0.5}$O$_4$ | 0.02 | 70 | 55 | 60 |
| Comparative Example 3 | LiMn$_{1.5}$Ni$_{0.5}$O$_4$ | 2 | 1 | 35 | 0.8 |
| Comparative Example 4 | LiMn$_{1.5}$Ni$_{0.5}$O$_4$ | 0.02 | 70 | 35 | 55 |
| Comparative Example 5 | LiMn$_{1.5}$Ni$_{0.5}$O$_4$ | 5 | 0.5 | 35 | 0.5 |
| Comparative Example 6 | LiCoO$_2$ | Carbonaceous material | | 35 | 4 |
| Comparative Example 7 | LiMn$_{1.5}$Ni$_{0.5}$O$_4$ | 0.3 | 10 | 10 | 1 |

| | Nonaqueous electrolyte | 0.2 A discharge initial capacity (mAh) | Initial capacity during discharge under 1 A (%) | Cycle life (the number of charge-discharge cycles) |
|---|---|---|---|---|
| Example 1 | EC + BL/LiBF$_4$: 1.5 mol/L | 700 | 80 | 400 |
| Example 2 | EC + BL/LiBF$_4$: 1.5 mol/L | 680 | 90 | 450 |

TABLE 1-continued

| | | | | |
|---|---|---|---|---|
| Example 3 | EC + BL/LiBF$_4$: 1.5 mol/L | 670 | 95 | 500 |
| Example 4 | EC + BL/LiBF$_4$: 1.5 mol/L | 650 | 75 | 350 |
| Example 5 | EC + BL/LiBF$_4$: 1.5 mol/L | 690 | 90 | 450 |
| Example 6 | EC + BL/LiBF$_4$: 1.5 mol/L | 680 | 78 | 350 |
| Example 7 | MEI/Li/BF$_4$ | 690 | 75 | 400 |
| Example 8 | dimethyl ethyl methoxy methyl ammonium ion/Li/BF$_4$ | 680 | 80 | 400 |
| Example 9 | EC + BL/LiBF$_4$: 1.5 mol/L | 720 | 90 | 500 |
| Example 10 | EC + BL/LiBF$_4$: 2 mol/L | 700 | 95 | 600 |
| Example 11 | MEI/Li/BF$_4$ | 700 | 80 | 800 |
| Example 12 | EC + DEC/LiPF$_6$: 1 mol/L | 720 | 85 | 500 |
| Example 13 | EC + DEC/LiPF$_6$: 1 mol/L | 800 | 70 | 600 |
| Example 14 | MEI/Li/BF$_4$ | 600 | 60 | 500 |
| Example 15 | EC + BL/LiBF$_4$: 1.5 mol/L | 900 | 80 | 350 |
| Comparative Example 1 | EC + BL/LiBF$_4$: 1.5 mol/L | 500 | 20 | 200 |
| Comparative Example 2 | EC + BL/LiBF$_4$: 1.5 mol/L | 540 | 80 | 250 |
| Comparative Example 3 | EC + BL/LiBF$_4$: 1.5 mol/L | 400 | 10 | 150 |
| Comparative Example 4 | EC + BL/LiBF$_4$: 1.5 mol/L | 400 | 50 | 200 |
| Comparative Example 5 | EC + BL/LiBF$_4$: 1.5 mol/L | 300 | 5 | 100 |
| Comparative Example 6 | EC + BL/LiBF$_4$: 2 mol/L | 700 | 85 | 20 |
| Comparative Example 7 | EC + BL/LiBF$_4$: 1.5 mol/L | 500 | 10 | 100 |

The nonaqueous electrolyte battery manufactured in each of Examples 1 to 15 included the negative electrode containing a negative electrode active material, which had a Li insertion potential of at least 0.2V (vs. Li/Li$^+$) and an average primary particle diameter not larger than 1 μm, the negative electrode having the specific surface area as determined by the BET method of 3 to 50 m$^2$/g. As apparent from Table 1, the nonaqueous electrolyte battery for each of these Examples was found to be excellent in the battery capacity, the charge-discharge cycle performance, and the capacity retention rate in the stage of the high rate discharge. Particularly, the battery capacity was further improved in the case where the specific surface area of the negative electrode was set to fall within a range of 5 to 50 m$^2$/g as in Examples 1 to 3 and 5 to 6. The surface of the negative electrode included in the nonaqueous electrolyte battery in each of the Examples was observed with an electron microscope, with the result that the agglomeration of the primary particles of lithium titanate was found to have been small, and that the primary particles noted above were found to have been dispersed uniformly.

It can be understood by the comparison among Examples 1 to 4 that the charge-discharge cycle performance and the capacity retention rate during the high rate discharge are increased with increase in the specific surface area as determined by the BET method of the negative electrode layer from 3 m$^2$/g to 10 m$^2$/g, 20 m$^2$/g and 50 m$^2$/g.

A preferred combination of the positive electrode active material and the nonaqueous electrolyte is employed in Examples 12 and 13 among Examples 1 to 15. The secondary battery in Examples 12 and 13 comprises a nonaqueous electrolyte containing EC and DEC, and a positive electrode active material represented by Li$_x$Mn$_{2-y}$Ni$_y$O$_4$ (0≤x≤1, 0.4≤y≤1) or Li$_a$Ni$_b$Co$_c$Mn$_d$O$_2$ (0≤a≤1.1, 0.1≤b≤0.5, 0≤c≤0.9, and 0.1≤d≤0.5). The particular combination of the positive electrode active material and the nonaqueous electrolyte makes it possible to suppress the decomposition of the nonaqueous electrolyte by the positive electrode. As a result, formation of a resistance film on the surface of the positive electrode can be suppressed so as to improve the charge-discharge cycle life of the secondary battery.

It can be understood by comparison between Examples 1 and 12 that the secondary battery for Example 12 comprising a nonaqueous electrolyte containing EC and DEC is superior to the secondary battery for Example 1 comprising a nonaqueous electrolyte containing EC and BL in any of the battery capacity, the charge-discharge cycle performance, and the capacity retention rate during the high rate discharge. If the nonaqueous electrolyte containing EC and BL the LiBF$_4$ concentration of which is excessively high as in Example 10, the battery capacity is sacrificed, though it is certainly possible to improve the charge-discharge cycle performance and the high rate discharge characteristics compared with Example 12. Where the secondary battery comprises a nonaqueous electrolyte containing EC and DEC as in Example 12, the charge-discharge cycle performance and the high rate discharge characteristics can be improved while maintaining a high battery capacity.

It can be understood by comparison between Examples 13 and 14 that the secondary battery for Example 13 comprising a nonaqueous electrolyte containing EC and DEC is superior to the secondary battery for Example 14 comprising a nonaqueous electrolyte containing a molten salt in any of the battery capacity, the charge-discharge cycle performance, and the high rate discharge characteristics.

On the other hand, the specific surface area of the negative electrode was smaller than 3 m$^2$/g in the nonaqueous electrolyte battery manufactured in Comparative Example 1, though the average primary particle diameter of the negative electrode active material was 1 μm. As a result, the nonaqueous electrolyte battery manufactured in Comparative Example 1 was found to be inferior to the nonaqueous electrolyte battery manufactured in each of Examples 1 to 15 in respect of the battery capacity, the charge-discharge cycle performance, and the capacity retention rate during the high rate discharge. The surface of the negative electrode included in the battery manufactured in Comparative Example 1 was observed with an electron microscope, with the result that observed were a large number of secondary particles formed by agglomeration of the primary particles of lithium titanate. In the battery manufactured in each of Comparative Examples 3 and 5, in which the average primary particle diameter of the negative electrode active material was larger than 1 µm, observed was a further deterioration in each of the battery capacity, the charge-discharge cycle performance and the capacity retention rate during the high rate discharge.

On the other hand, the specific surface area of the negative electrode was larger than 50 m²/g in the nonaqueous electrolyte battery manufactured in each of Comparative Examples 2 and 4, though the average primary particle diameter of the negative electrode active material was not larger than 1 µm. In this case, the battery was inferior to the battery manufactured in each of Examples 1 to 15 in respect of the battery capacity and the charge-discharge cycle performance.

Also, the experimental data for Comparative Example 6 support that, where an active material such as a carbonaceous material, which exhibits the Li insertion potential lower than 0.2V (vs. Li/Li⁺), is used in the negative electrode, the decomposition of the nonaqueous electrolyte is promoted by the negative electrode even if the specific surface area of the negative electrode falls within a range of 3 to 50 m²/g. As a result, the battery is rendered inferior to the battery in each of Examples 1 to 15 in respect of the charge-discharge cycle performance.

Further, the experimental data for Comparative Example 7 support that, even if the specific surface area of the negative electrode active material falls within a range of 3 to 50 m²/g, the specific surface area of the negative electrode is rendered smaller than 3 m²/g in the case where the porosity of the negative electrode is lowered by the increase in pressure in the pressing stage of the negative electrode. As described previously, it is possible for the specific surface area of the negative electrode (or the specific surface area of the negative electrode layer) to be changed by various factors affecting the dispersed state of the primary particles of the negative electrode active material. Incidentally, the various factors noted above include, for example, the addition amount of the binder, the addition amount of the conductive agent, the average particle diameter and the specific surface area of the conductive agent, the stirring conditions of the slurry, and the pressing conditions as indicated in Comparative Example 7. It follows that the specific surface area of the negative electrode or the negative electrode layer is not unconditionally determined by the average primary particle diameter and the specific surface area of the negative electrode active material.

As described above in detail, according to the embodiment of the present invention, it is possible to provide a nonaqueous electrolyte battery excellent in both the high-rate characteristics and the charge-discharge cycle characteristics.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A nonaqueous electrolyte battery comprising
a laminate film case;
a positive electrode provided in the laminate film case and comprising an active material;
a separator provided in the laminate film case;
a negative electrode provided in the laminate film case and comprising a current collector and a porous negative electrode layer supported by the current collector and comprising a negative electrode active material, the negative electrode active material having a Li insertion potential not lower than 0.2V (vs. Li/Li⁺) and an average primary particle diameter not larger than 1 µm, a specific surface area of the porous negative electrode layer as determined by the BET method utilizing a N₂ adsorption and falling within a range of 3 to 50 m²/g, and the porous negative electrode layer facing the separator; and
a nonaqueous electrolyte provided in the laminate film case.

2. The nonaqueous electrolyte battery according to claim 1, wherein a porosity of the negative electrode excluding the current collector falls within a range of 20 to 50%.

3. The nonaqueous electrolyte battery according to claim 1, wherein the Li insertion potential of the negative electrode active material is 0.2 to 3V (vs. Li/Li⁺).

4. The nonaqueous electrolyte battery according to claim 1, wherein the average primary particle diameter of the negative electrode active material is 0.001 to 1 µm.

5. The nonaqueous electrolyte battery according to claim 1, wherein the specific surface area of the negative electrode falls within a range of 5 to 50 m²/g.

6. The nonaqueous electrolyte battery according to claim 1, wherein the negative electrode active material comprises a lithium titanium oxide and/or a titanium containing composite oxide.

7. The nonaqueous electrolyte battery according to claim 6, wherein the lithium titanium oxide is represented by $Li_{4+x}Ti_5O_{12}$ ($-1 \leq x \leq 3$) or $Li_{2+x}Ti_3O_7$ ($-1 \leq x \leq 3$).

8. The nonaqueous electrolyte battery according to claim 6, wherein the titanium-containing composite oxide contains at least one kind of element selected from the group consisting of P, V, Sn, Cu, Ni and Fe.

9. The nonaqueous electrolyte battery according to claim 1, wherein the active material of the positive electrode comprises at least one kind of the compound selected from the group consisting of a lithium-nickel-cobalt-manganese composite oxide, a spinel-type lithium-manganese-nickel composite oxide, a lithium-phosphorus oxide having an olivine structure, a lithium-cobalt oxide, a lithium-nickel-cobalt composite oxide, and a lithium-manganese composite oxide.

10. The nonaqueous electrolyte battery according to claim 9, wherein the lithium-nickel-cobalt-manganese composite oxide is represented by $Li_aNi_bCo_cMn_dO_2$ and the molar ratios of a, b, c, and d fall within the ranges of $0 \leq a \leq 1.1$, $0.1 \leq b \leq 0.5$, $0 \leq c \leq 0.9$, and $0.1 \leq d \leq 0.5$.

11. The nonaqueous electrolyte battery according to claim 1, wherein the nonaqueous electrolyte contains an ionic liquid.

12. The nonaqueous electrolyte battery according to claim 1, wherein the nonaqueous electrolyte comprises a molten salt, the molten salt containing lithium ion, organic cation having a skeletal structure given below and anion:

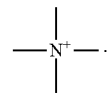

13. The nonaqueous electrolyte battery according to claim 12, wherein the organic cation includes alkyl imidazolium ion and/or tetraalkyl ammonium ion, and the anion includes at least one ion selected from the group consisting of $BF_4^-$, $PF_6^-$, $AsF_6^-$, $ClO_4^-$, $CF_3SO_3^-$, $CF_3COO^-$, $CH_3COO^-$, $CO_3^{2-}$, $N(CF_3SO_2)_2^-$, $N(C_2F_5SO_2)_2^-$, and $(CF_3SO_2)_3C^-$.

14. The nonaqueous electrolyte battery according to claim 1, wherein the nonaqueous electrolyte comprises at least one kind of a nonaqueous solvent selected from the group consisting of propylene carbonate, ethylene carbonate, diethyl carbonate and γ-butyrolactone.

15. A nonaqueous electrolyte battery comprising
a laminate film case;
a positive electrode provided in the laminate film case and comprising an active material;
a separator provided in the laminate film case;
a negative electrode provided in the laminate film case and comprising a current collector and a porous negative electrode layer supported by the current collector, the negative electrode layer comprising a negative electrode active material having a Li insertion potential not lower than 0.2V (vs. Li/Li$^+$) and an average primary particle diameter not larger than 1 μm, a specific surface area of the porous negative electrode layer as determined by the BET method utilizing a N$_2$ adsorption, and the specific surface area of the negative electrode layer falling within a range of 3 to 50 m$^2$/g, and the porous negative electrode layer facing the separator; and
a nonaqueous electrolyte provided in the laminate film case.

16. The nonaqueous electrolyte battery according to claim 15, wherein the negative electrode active material comprises a lithium titanium oxide and/or a titanium-containing composite oxide, and the active material of the positive electrode comprises at least one kind of the compound selected from the group consisting of a lithium-nickel-cobalt-manganese composite oxide, a spinel-type lithium-manganese-nickel composite oxide, a lithium-phosphorus oxide having an olivine structure, a lithium-cobalt oxide, a lithium-nickel-cobalt composite oxide, and a lithium-manganese composite oxide.

17. A nonaqueous electrolyte battery, comprising
a laminate film case;
a positive electrode provided in the laminate film case and comprising an active material;
a separator provided in the laminate film case;
a negative electrode provided in the laminate film case and comprising a current collector and a porous negative electrode layer supported by the current collector, the negative electrode layer comprising a negative electrode active material, the negative electrode active material comprising a lithium titanium oxide and/or a titanium-containing composite oxide and having an average primary particle diameter not larger than 1 μm, a specific surface area of the porous negative electrode layer as determined by the BET method utilizing a N$_2$ adsorption, and the specific surface area of the negative electrode layer falling within a range of 3 to 50 m$^2$/g, and the porous negative electrode layer facing the separator; and
a nonaqueous electrolyte provided in the laminate film case.

18. The nonaqueous electrolyte battery according to claim 17, wherein:
the active material of the positive electrode comprises at least one compound selected from the group consisting of a lithium-nickel-cobalt-manganese composite oxide, a spinel-type lithium-manganese-nickel composite oxide, a lithium-phosphorus oxide having an olivine structure, a lithium-cobalt oxide, a lithium-nickel-cobalt composite oxide, and a lithium-manganese composite oxide; and
the nonaqueous electrolyte contains alkyl imidazolium ion and/or tetraalkyl ammonium ion, lithium ion, and at least one kind of an anion selected from the group consisting of $BF_4^-$, $PF_6^-$, $AsF_6^-$, $ClO_4^-$, $CF_3SO_3^-$, $CF_3COO^-$, $CH_3COO^-$, $CO_3^{2-}$, $N(CF_3SO_2)_2^-$, $N(C_2F_5SO_2)_2^-$, and $(CF_3SO_2)_3C^-$.

19. The nonaqueous electrolyte battery according to claim 17, wherein:
the active material of the positive electrode comprises at least one compound selected from the group consisting of a lithium-nickel-cobalt-manganese composite oxide, a spinel-type lithium-manganese-nickel composite oxide, a lithium-phosphorus oxide having an olivine structure, a lithium-cobalt oxide, a lithium-nickel-cobalt composite oxide, and a lithium-manganese composite oxide; and
the nonaqueous electrolyte comprises at least one kind of an nonaqueous solvent selected from the group consisting of propylene carbonate, ethylene carbonate, diethyl carbonate, and γ-butyrolactone.

20. The nonaqueous electrolyte battery according to claim 17, wherein the current collector is formed of aluminum or aluminum alloy.

21. The nonaqueous electrolyte battery according to claim 9, wherein the lithium-manganese composite oxide comprises $Li_xMn_2O_4$, wherein $0 \leq x \leq 1$.

22. The nonaqueous electrolyte battery according to claim 9, wherein the lithium-phosphorus oxide having the olivine structure comprises at least one selected from the group consisting of $Li_xFePO_4$ and $Li_xFe_{1-y}Mn_yPO_4$, wherein $0 \leq x \leq 1$ and $0 \leq y \leq 1$.

* * * * *